I. RAFFELSON.
TIRE PROTECTOR.
APPLICATION FILED FEB. 28, 1919.

1,336,757.

Patented Apr. 13, 1920.

INVENTOR
Isaac Raffelson
BY
E. W. Marshall
ATTORNEY

UNITED STATES PATENT OFFICE.

ISAAC RAFFELSON, OF NEW YORK, N. Y.

TIRE-PROTECTOR.

1,336,757. Specification of Letters Patent. Patented Apr. 13, 1920.

Application filed February 28, 1919. Serial No. 279,765.

*To all whom it may concern:*

Be it known that I, ISAAC RAFFELSON, a citizen of the United States of America, and a resident of New York, county and State of New York, have invented certain new and useful Improvements in Tire-Protectors, of which the following is a specification, reference being had to the accompanying drawings, forming a part thereof.

My invention relates to tire protectors, and its object is to provide a simple and effective cover for spare tires which will not only protect them from the elements, and serve as a guard against their removal by an unauthorized person, but which will afford a complete protection against their being tampered with or injured.

Another object is to make such a protector easily manipulated for either inserting or removing the tires.

A still further object is to make the protector neat and attractive in appearance.

In order that my invention may be thoroughly understood I will now proceed to describe the same in the following specification, and will then point out the novel features thereof in appended claims.

Referring to the drawings.

Like characters of reference designate corresponding parts in all the figures.

10 designates an automobile on the rear of which is a tire holder or bracket 11 which may be of any desired form or construction and which forms no part of this invention. This is adapted to engage the rim 12 of a tire 13 and to support the tire by such engagement.

Figure 3:
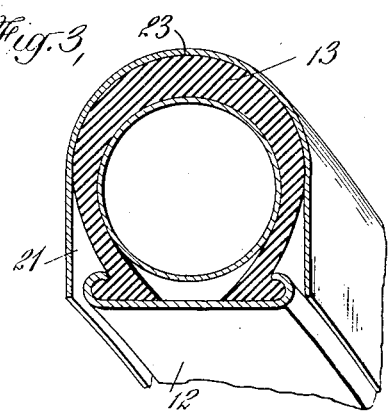
Fig. 3 is a perspective view partly in section of a portion of a tire and an adjacent part of one of my covers therefor.

My improved tire protector in its preferred form comprises three sections 20, 21 and 22. These are of sheet steel or other hard metal and of a cross-sectional shape shown in Fig. 3 to surround and cover the tread of the tire as at 23 and to extend inwardly to the rim. They are of sufficient length to surround the tire circumferentially. The lower part 20 is to be affixed to the rear of the car 10 and is perforated as at 24 to allow any water which may be caught in it, to drain off.

The part 21 is hinged to the part 20 at 25 and the part 22 is hinged to the part 20 at 26. A hasp and a lock are provided at 27 between the parts 21, 22.

Figure 1:
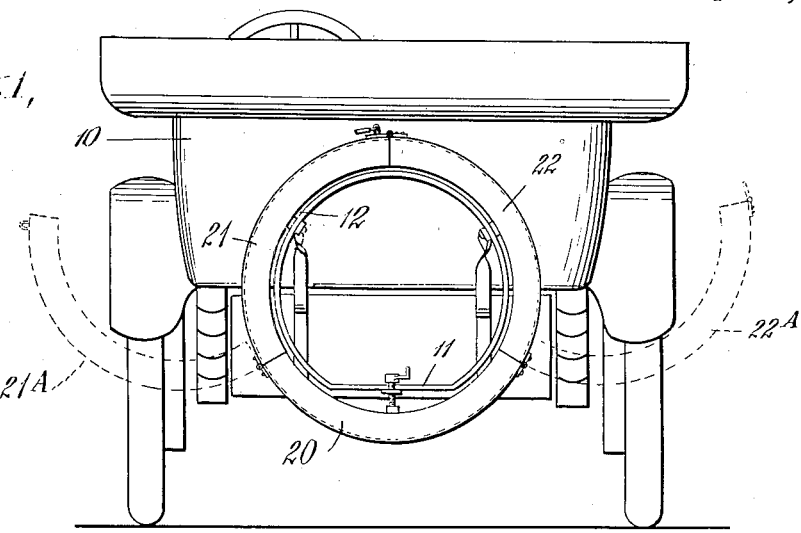
Figure 1 is a rear view of an automobile with a tire protector thereon which is made according to and embodies my invention.
Figure 2:
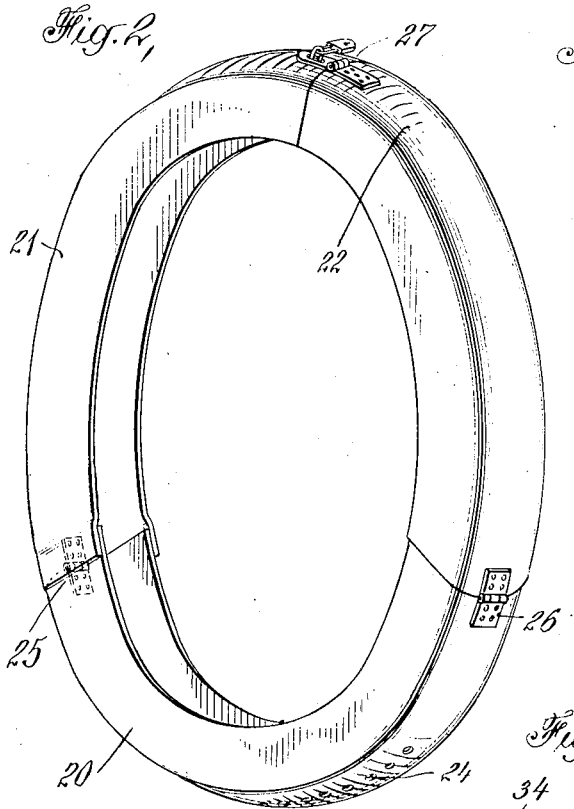
Fig. 2 is a perspective view of one of my novel tire protectors.

When it is desired to remove a tire from the cover, the adjoining ends of the parts 21, 22 are unlocked and then these parts are swung over about their hinges into the positions in which they are indicated by dotted lines in Fig. 1, and designated by the reference numerals 21ᴬ and 22ᴬ. When in this condition the tire may be easily lifted out or inserted in the protector. When the cover is placed and locked over the tire it cannot be injured even by one with malicious intent, and is thoroughly protected from dirt and from the elements. The metal of which the protector is made is preferably enameled to match the car with which it is to be used.

Figure 4:
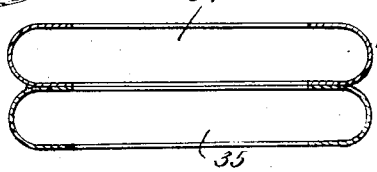
Fig. 4 is a sectional plan view of a double protector or one adapted to receive and cover two tires.

In Fig. 4 a part of a double protector is shown with the sections thereof designated by 34—35. The way this is used is obvious.

The protector is of strong and rugged construction and will last almost indefinitely. It not only protects the tire in the manner described, but has no bad effect on the tire such as overheating.

Several constructions have been illustrated and described to show that I do not limit myself to any specific form of construction and in fact I intend no limitations other than those imposed by the appended claims.

What I claim is:

1. A tire protector comprising a lower member adapted to be secured to an automobile and two upper members, all of said members being of substantially the same length, hinge connections between the lower ends of the upper members and opposite ends of the lower member below the center of the tire, and means for fastening together the other ends of the upper members, said members being transversely bent to encircle the tread of a tire and having parallel sides extending inwardly to the rim flanges of the tire, and together adapted to encircle a tire.

2. A tire protector comprising a lower member adapted to be secured to an automobile and two upper members, all of said members being of substantially the same length, hinge connections between the lower ends of the upper members and opposite ends of the lower member below the center of the tire, and locking means for fastening together the other ends of the upper members, said members being transversely bent to encircle the tread of a tire and having parallel sides extending inwardly to the rim flanges of the tire, and together adapted to encircle a tire, and the lower ends of the upper members overlapping adjacent ends of the lower member.

3. A tire protector comprising a lower member adapted to be secured to an automobile and two upper members, all of said members being substantially the same length, hinge connections between the lower ends of the upper members and opposite ends of the lower member below the center of the tire, and locking means for fastening together the other ends of the upper members, said members being transversely bent to encircle the tread of a tire and having parallel sides extending inwardly to the rim flanges of the tire, and together adapted to encircle a tire, the lower ends of the upper members overlapping adjacent ends of the lower member, and said lower member being provided with drainage holes.

In witness whereof, I have hereunto set my hand this 27 day of Feb., 1919.

ISAAC RAFFELSON.